United States Patent [19]

Andrews et al.

[11] 3,949,501
[45] Apr. 13, 1976

[54] NOVEL IDENTIFICATION CARD

[75] Inventors: Paul A. Andrews, Belmont; Richard M. Raia, Lexington, both of Mass.

[73] Assignee: Polaroid Corporation, Cambridge, Mass.

[22] Filed: Dec. 7, 1973

[21] Appl. No.: 422,662

Related U.S. Application Data

[63] Continuation-in-part of Ser. No. 295,201, Oct. 5, 1972, abandoned, which is a continuation-in-part of Ser. No. 866,875, Oct. 16, 1969, abandoned.

[52] U.S. Cl. .............................. 40/2.2; 235/61.12 M
[51] Int. Cl.² ............................................. G09F 3/02
[58] Field of Search ......... 161/147; 283/7; 101/369; 40/2.2, 1

[56] References Cited
UNITED STATES PATENTS

| | | | |
|---|---|---|---|
| 3,114,208 | 12/1963 | Wellman | 40/158 R |
| 3,283,713 | 11/1966 | Wooster | 40/2.2 X |
| 3,350,800 | 11/1967 | Witt et al. | 40/2.2 |
| 3,457,661 | 7/1969 | Peters | 40/2.2 |
| 3,512,130 | 5/1970 | Hulett | 40/2.2 X |
| 3,526,567 | 9/1970 | Macone | 40/2.2 X |
| 3,582,439 | 6/1971 | Thomas | 40/2.2 X |
| 3,601,913 | 8/1971 | Pollock | 40/2.2 |
| 3,758,970 | 9/1973 | Annenberg | 40/2.2 |
| 3,874,979 | 4/1975 | Hannon | 161/6 |

*Primary Examiner*—Louis G. Mancene
*Assistant Examiner*—Wenceslao J. Contreras
*Attorney, Agent, or Firm*—John P. Morley

[57] ABSTRACT

Novel identification (ID) cards including an information-bearing surface, e.g., a photo, having a substantially transparent overlay, a portion of this overlay being provided with magnetic encoding means.

5 Claims, 5 Drawing Figures

NOVEL IDENTIFICATION CARD

CROSS-REFERENCE TO RELATED APPLICATIONS

This application is a continuation-in-part of U.S application Ser. No. 295,201 filed Oct. 5, 1972 now abandoned which, in turn, is a continuation-in-part of U.S. Pat. application Ser. No. 866,875 filed Oct. 16, 1969 now abandoned.

BACKGROUND OF THE INVENTION

Identification (ID) cards have become increasingly prevalent in our society, not only for making credit purchases, but also as a means for identifying the intended bearer in such diverse places as business, manufacturing installations, governmental installations, colleges and universities, etc. where a more positive identification of the bearer is desired.

Such cards in general comprise an information-bearing surface containing suitable matter identifying the intended bearer and usually the issuer as well, the surface frequently being provided with a protective transparent overlay of some description.

One form of ID card becoming increasingly prevalent is the so-called photo ID card wherein the information bearing surface includes a photo of the bearer, either in color or in black-and-white. This surface generally includes other descriptive indicia further identifying the bearer and/or issuer, validating signatures, identifying numbers and the like. This descriptive indicia may, in whole or in part, be a portion of the photograph along with the picture of the bearer, or it may be contained on the information-bearing surface in other forms, e.g., typing, printing, etc.

To protect the information-bearing surface from damage, it has heretofore been known to provide a transparent sheet material over the image-bearing surface. It is also known to laminate this sheet material or overlay to the information-bearing surface to minimize or preclude tampering or forgery. With such laminations, for example, attempts to sever the overlay cause detectable damage or destruction of the information-bearing surface.

This transparent sheet material providing such protective features may be employed in various forms and in various product structures. Thus, for example, such an ID card may comprise an information-bearing surface having a transparent sheet material laminated to the surface thereof. In another form, the ID card is encased between a pair of superposed sheet materials, at least one of which is transparent for viewing of the card. These superposed sheet materials may be provided in the form of a pouch or the like, e.g., sealed together along three sides to leave one side open for insertion of the card, or they may be sealed together along one side only, in which event the card is simply placed therebetween. In either event, following placement of the card, the unsealed periphery of the respective sheet materials are preferably then sealed together to encase the card completely. In a particularly preferred form, a laminar structure is provided wherein the information-bearing surface is bonded to the inner surface of the transparent overlying sheet material. If desired or found expedient to do so, the rear surface of the card may be bonded to the inner surface of the other sheet material.

In the ID card structures of the foregoing description, it has heretofore been known to provide embossed indicia on the transparent overlay for recording transactions by the bearer of the card. Such embossed indicia may include, for example, the name and an identifying account number of the bearer.

It has also been suggested that the card be "hole-punched" to be used in conjunction with electrical recording devices of known description.

The present invention is directed to still another, and in a sense more sophisticated, means for adapting ID cards of this description for automatic recording of transactions.

SUMMARY OF THE INVENTION

According to the present invention, a novel protective envelope pre-cut to desired dimensions is provided for I. D. credit cards. Essential features of the novel precut envelope comprise two sheets of plastomeric material coupled together to permit wide separation of the sheets. In preparing I. D. credit cards of the present invention, an information bearing medium is placed between the sheet materials and accommodated in a distinctive fashion by one of the sheet materials. The information of the information bearing medium is viewed through one of the sheet materials which is also provided with magnetic encoding means having the capability of imparting to the I. D. card descriptive or identifying indicia pertaining to the authorized bearer. This magnetic encoding means may be used in conjunction with known apparatus to both validate the card and to record transactions, e.g., purchases and the like, by the bearer.

The magnetic encoding means comprises one of the known magnetic materials, e.g., iron oxide, applied to a portion of the outer surface of the transparent overlay, e.g., by coating, hot stamping, silk screening, lithography or other techniques, after which application the material may then be selectively demagnetized to leave selected areas of magnetic material providing a code number or other indicia peculiar to the bearer.

DESCRIPTION OF THE PREFERRED EMBODIMENTS

Figure 1:
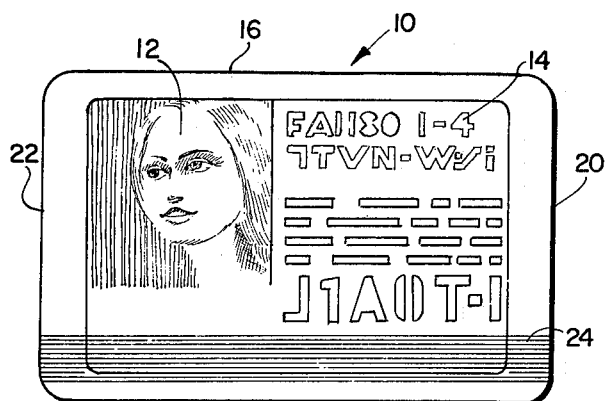
FIGS. 1 and 2 are plan views of one side (front) of illustrative credit cards of the present invention.

In accordance with the practice of the present invention a novel protective envelope is employed to provide I. D. credit cards having a magnetic encoding capability. Essential elements of the protective envelope comprise two plastomeric sheet materials coupled together to permit wide separation thereof along two adjacent edges and an adherent capability integrated with said elements so that an information bearing medium can be laminated therebetween. Information on the information bearing medium can be viewed through one of the sheet materials and the sheet material through which the information is viewed, e.g., the substantially transparent sheet material is also provided with a magnetic encoding capability. Additionally, the protective envelope provides means for accommodating the information bearing medium in a distinctive fashion which will be explained in more detail hereinafter. In the preferred embodiment the magnetic encoding means is applied in the form of a stripe over a predetermined area of the transparent sheet material, e.g., across the longer dimension (width) of the sheet.

As was mentioned previously, this invention is directed to I.D. cards and, more particularly, to novel I.D. cards provided with magnetic encoding means adapted for use in devices for identifying the bearer and/or recording transactions by him.

A primary object of this invention, therefore, is to provide I.D. cards.

Still another object is to provide novel products for encasing an information-bearing sheet material such as a photograph.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

As was mentioned previously, I.D. cards including an information bearing surface provided with a protective transparent sheet material overlay are well known in the art. It is also known to employ as this overlay an embossable material which is provided with embossed indicia peculiar to the authorized bearer so that the card is then adapted for use with conventional stamping machines or the like to record transactions automatically. In another type of product structure adapted for automatically recording transactions, the I.D. card, including the transparent overlay, is "hole punched" for use with electrical recording devices of known description.

It has further been suggested to employ magnetic encoding means to render ID cards and the like adaptable for such automation. This magnetic encoding means in general comprises a material such as $Fe_2O_3$ more commonly employed in magnetic tapes. The material may be applied to the card and then selectively demagnetized to provide coded areas containing indicia peculiar to the bearer which can be identified and/or recorded by known devices at an inspection station or the like where the card is presented. As illustrative of patents pertaining to magnetic credit cards, mention may be made of the following U.S. Pat. Nos. 3,075,194; 3,274,352; 3,245,697; 3,419,710; 3,430,200; and 3,454,598.

The present invention is directed to novel ID cards including an information-bearing surface provided with a transparent overlay, the essence of the invention being applying to this overlay magnetic encodng means over a predetermined area, e.g., in the form of a stripe of the like, which will not obscure any pertinent information on the underlying information-bearing surface, to provide an ID card which is both aesthetically pleasing and adaptable for use with known devices to identify the bearer and to record automatically purchases or other transactions by him.

The invention, which is particularly adaptable for use with so-called photo I.D. cards, will be more readily apparent by reference to the accompanying drawing.

The invention will be more readily apparent by reference to the accompanying drawing of an illustrative credit card contemplated by this invention.

Figure 2:
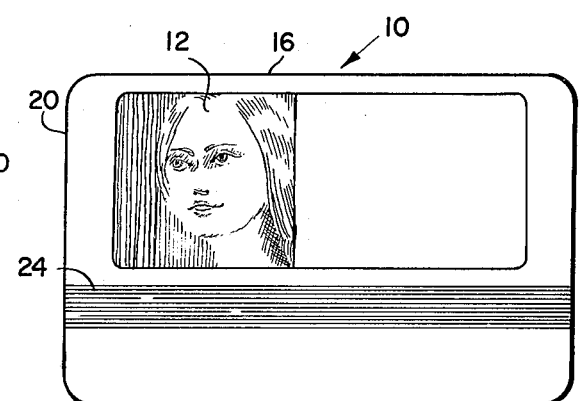

FIGS. 1 and 2 represent embodiments of credit cards of the present invention of the so-called photo I.D. configuration. Such cards have a generally flat front side (FIG. 1) revealing a photo 12 of the bearer along with suitable other identifying matter 14. While the card is generally rectangular, having parallel top and bottom edges 16 and 18 respectively, and parallel side edges 20 and 22, it is shown to have rounded corners.

The front side of the card bears a magnetic stripe 24 of known material and function extending substantially along the full length of the card from side edge 20 to side edge 22 and parallel to bottom edge 18.

The reverse or rear side (FIG. 3) of the card of FIGS. 1 and 2 contains suitable design and other indicia 38 pertaining to and identifying the issuer of the card and embossed identifying matter 36, e.g., name, address and account number of the bearer, suitable for use in conventional devices for accounting and/or billing purposes pertaining to transactions by the bearer.

Photo 28 may be prepared by any of the known photographic techniques and the method of preparation per se comprises no part of this invention. Since it is, of course, preferable that the photo system employed be such that the subject or bearer can be photographed and the card prepared and issued on the spot, the preferred system for preparing photo 28 utilizes principles in photography known as diffusion transfer to obtain either black-and-white or color photos, as the case may be. Most preferred are color images and these may be obtained in accordance with the procedures described and claimed in U.S. Pat. No. 2,983,606. As is disclosed in this patent, a photosensitive element including one or more light-sensitive silver halide emulsions each having associated therewith a dye developer (a dye which is also a silver halide developing agent) is exposed and then developed with an aqueous alkaline processing composition; as a function of development an imagewise distribution of diffusible dye is formed; and this imagewise distribution is then transferred, at least in part, by diffusion, to a superposed receiving element to impart thereto a positive dye transfer image.

A particularly useful system for preparing photo 28 utilizes diffusion transfer photographic principles such as the color system described in the aforementioned U.S. pat. to provide a photo of the bearer along with descriptive information pertaining to him. This may be accomplished by inserting a data card containing this descriptive information in the camera so that both the subject matter and the descriptive matter pertaining to him are simultaneously photographed to provide a single developable image which is thereafter processed to provide a transfer print comprising a suitable support having thereon an image-bearing layer containing an image of the subject at one portion thereof and the descriptive matter at another portion thereof, e.g., photo 28 having the likeness or image of the bearer 12 and the descriptive matter 14, as shown in the drawing. This procedure for preparing the photograph may be accomplished most expeditiously with a Polaroid ID-3 Land Identification System. It will, of course, be appreciated that photo 28 may be prepared by other systems and the descriptive matter 14 may be applied, for example, by typing, printing, etc. In like manner photo 28 may comprise a suitable sheet material on which photo 12 is adhered by means of a suitable adhesive.

Figure 4:
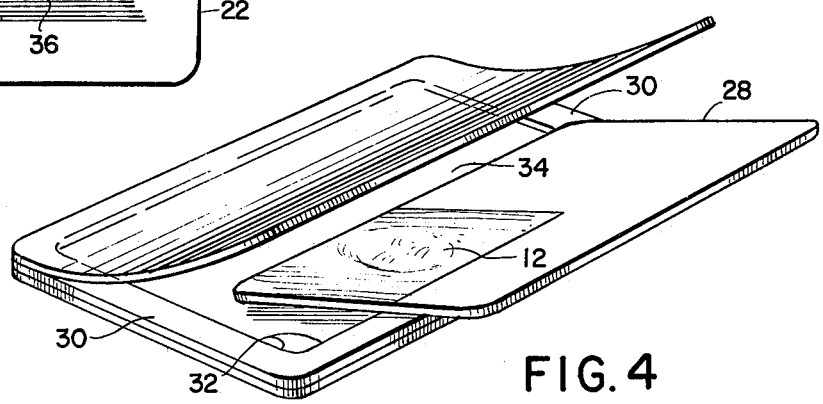
FIGS. 4 and 5 are perspective views of protective envelopes employed in the practice of the present invention.
Figure 5:
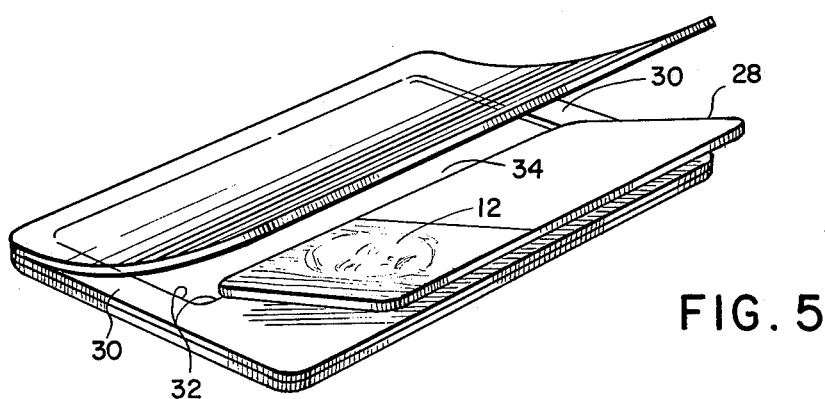

FIGS. 4 and 5 illustrate pre-cut protective envelopes of the present invention providing I.D. cards of the type shown in FIGS. 1 and 2 respectively. As mentioned, essential elements of the pre-cut envelopes of FIGS. 4 and 5 comprise a front sheet member 26 coupled together to permit wide separation thereof. For example, as shown, member 26 is coupled to frame 30 along edge 36; in turn, frame 30 is secured to rear sheet member 34. Front sheet member 26 is transparent and has a magnetic encoding capability, e.g., a magnetic stripe 24 on the outer (topmost) side thereof. Frame 30 is of substantially the same peripheral dimensions as front sheet member 26 and has a large rectangular opening 32 of substantially the same peripheral dimensions of photo 28 but being slightly larger than photo 28 so that frame 30 can accommodate photo 28. The thickness of frame 30 is substantially the same as the thickness of photo 28 to thereby provide a frame into which the photo is placed. Back sheet 34 is preferably opaque and of substantially the same dimensions as overlay 26 and frame 30, and may contain on its outer (rear) side, suitable identifying material as shown in FIG. 2. Frame 30 is laminated to rear sheet 34 by any suitable adhesive means.

Front wall member 26 may comprise any of the known transparent materials, e.g., transparent plastics such as polyethylene terephthalate, vinyl resins such as copolymers of vinyl acetate and vinyl chloride, cellulose esters such as cellulose acetate, cellulose triacetate, cellulose butyrate, etc. It may, for example, comprise a vinyl chloride/vinyl acetate copolymer on the order of about 12 mils thick. In the especially preferred embodiment of the present invention, member 26 comprises a vinyl chloride polymer or copolymer sheet, for example, a vinyl choride, vinyl acetate copolymer sheet on the order of 12 mils thick.

Figure 3:
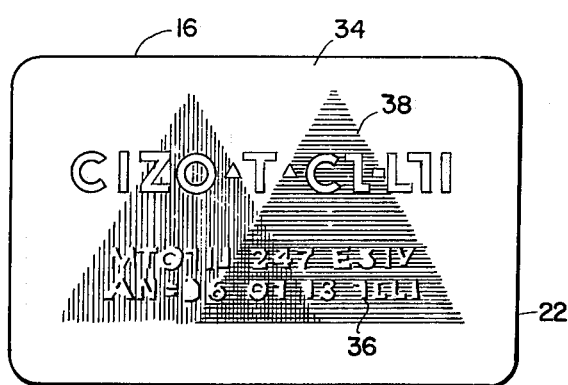
FIG. 3 is a plan view of the other (rear) side of credit cards of the type shown in FIGS. 1 and 2.

Magnetic stripe 24 which may, for example, be on the order of a quarter inch in width may be applied to one surface of sheet 26 by any of the known techniques. Stripe 24 is preferably provided for application in the form of a tape on the order of 2 mils thick comprising a ferric oxide dispersed in a matrix of a polyvinyl chloride polymer or copolymer. The tape may then be applied with the aid of a solvent such as a ketone, an adhesive, by hot stamping, etc., to provide member 26 containing on one surface thereof the magnetic stripe 24. The opposed surface of member 26 may be coated with a heat-activated adhesive, e.g., an acrylic or polyester heat-activated adhesive, for lamination of member 26 to the underlying sheet material which, as is shown in FIGS. 3 and 4 comprises photo 28 and portions of frame 30. Especially suitable heat activatable adhesives are mixtures of polyacrylonitrile and vinyl chloride/vinyl acetate copolymers.

Frame 30 may comprise a suitable plastic material and is preferably a pigmented vinyl chloride polymer or copolymer. It may, for example, comprise a vinyl chloride/vinyl acetate copolymer on the order of about 9 mils thick including a suitable white pigment such as titanium dioxide for aesthetic purposes. Frame 30 is adhered to sheet material 34 and this may be accomplished, for example, by spot welding with dielectric heat sealing equipment per se known in the art. As was heretofore mentioned, frame 30 provides an opening slightly larger than photo 28 and is of at least the thickness of photo 28 so as to provide a frame in which photo 28 is seated on sheet material 34. Accordingly, frame 30 provides means for positively positioning and retaining photo 28 thereby facilitating assembly of the card and preventing any possibility of shifting of photo 28 during lamination. Also, as can be seen in FIGS. 3 and 4, after insertion of photo 28, and superpositioning of sheet members 26 and 34, a substantially flat surface is available to provide support for substantially all portions of magnetic stripe 24. In FIG. 3, for example, photo 28 primarily provides this support for stripe 24 while frame 30 functions in this fashion in the embodiment shown in FIG. 4.

Sheet 34 comprises a heat-flowable material capable of forming embossed indicia in accordance with the manner disclosed in commonly assigned copending application Ser. No. 249,695 filed May 1, 1972. It may, for example, comprise any of the known thermoplastic or thermosetting polymeric materials which, upon applying heat and pressure, will permit the embossing step of this invention to be performed. It may, for example, comprise a vinyl chloride/vinyl acetate copolymer on the order of about 10 mils thick which is pigmented to provide the desired background for the indicia 38 shown in FIG. 2. This indicia may be prepared by any of the known techniques such as silk screening, lithography, offset or other such printing techniques which are well known in the art.

The credit card shown in the illustrative drawing may be prepared simply and efficiently in the following manner.

Photo 28 is first prepared and inserted between front wall member 26 and rear wall member 34 to frame 30 to provide an I.D. card assembly which is then placed in the well of a platen for lamination. The well in which the card and mold are placed is at least as thick as the combined thickness of the elements of the assembly so that pressure and heat conductive means may then be applied evenly over the surface of the card. Preferably, the well bears substantially the same dimensions as the periphery of the card so as to preclude lateral movement of sheet 26 during the laminating step since in those credit cards wherein a magnetic stripe or the like is to be provided prior to lamination, this is an important feature of the present invention as it prevents distortion or "mud-cracking" of the magnetic stripe during the laminating step.

Lamination of the assembly may be accomplished, for example, by clamping or otherwise securing a pressure plate over the outer surface (sheet 26) of the assembly so as to confine it securely under pressure between the base of the well and the pressure plate, lateral movement being precluded by the sides of the well. The pressure plate may comprise a heat-conductive material such as steel which is preferably quite thin so as to minimize the time required for heat transfer during the heating step to seal the card and to emboss, and the subsequent cooling step.

Following application of the pressure plate, a heating block of known description is brought against the outer surface of the pressure plate for the requisite period of time and the resulting heat transfer seals the card and simultaneously embosses. By way of example, a heating block of at least the dimensions of the card at a temperature of on the order of 335°F may be held against the pressure plate for about 30 seconds to perfect lamination and simultaneous embossing. Under such conditions, it has been determined that after about 30 seconds the top (sheet 26) is heated to about 315°F (a heat loss of about 20°F over the temperature of the heating element) and the underside (sheet 34) is heated to a temperature slightly in excess of 225°F.

Following this thirty second heating time, the card is then cooled while maintaining the pressure plate to confine the card under pressure. A preferred method of cooling is to remove the heating block and in its place apply a cool or chilled block to the outer surface of the pressure plate. Due to the thinness of this plate, cooling time is minimal and in 30 seconds or less the pressure plate may be removed to provide the completed card. Additional details relating to the lamination of I.D. credit cards can be found in commonly assigned application Ser. No. 295,203 filed Oct. 5, 1972 by Robert D. Brackett and Paul A. Plasse.

The many advantages presented by the use of the novel pre-cut envelopes of the present invention will be apparent to those skilled in the art. For example, as those in the art know, a magnetic encoding capability is usually integrated with I.D. credit cards by way of a separate step after lamination. Although this approach has obvious disadvantages, nevertheless it is oftentimes required in order to correctly register the magnetic capability at the desired position of the final card and also to avoid disruption or distortion of the capability because of the pressures involved in the lamination operation. In the novel envelopes of the present invention these problems are conveniently avoided. For example, the envelopes are precut to the desired final dimension and accordingly the magnetic encoding capability can be positioned in any desired location to satisfy particular specifications of specific users of the card.

Equally important, the problem of disruption or distortion of the magnetic encoding capability during lamination is avoided by employing the envelopes of the present invention. This advantage is considered to be due to the manner in which frame 30 functions to accommodate the photo during lamination to provide a flat, supporting surface beneath substantially all portions of the magnetic encoding capability. For example, the integration of frame 30 in envelopes of the type shown in FIG. 4 is such that photo 28 primarily provides the supporting surface while in envelopes of the type shown in FIG. 5, frame 30 provides this supporting surface. Accordingly, as pressure is applied during lamination to the magnetic encoding capability, e.g., the stripe, the capability is compressed into the transparent sheet material which is maintained in a substantially planar condition during lamination to thereby avoid conditions that could cause distortion or disruption of the magnetic capability.

In addition to providing the flat supporting surface, frame 30 also provides means for positively positioning and retaining the photo which facilitates assembly and prevents dislocation of the photo during lamination. Accordingly, the envelopes presented to the art by way of the present invention provide such improved performance characteristics as easy assembly, positive positioning, retention of the photo during lamination, elimination of post trimming and the final I.D. credit cards obtained have a substantially even and substantially planar surface containing an effective magnetic encoding capability without the requirement of further operations after lamination.

Since certain changes may be made in the above description of the preferred embodiments of the invention, it is intended that all matter contained in the above description shall be interpreted as illustrative and not in a limiting sense.

What is claimed is:

1. An I.D. credit card which comprises an information-bearing medium encased within a laminated envelope said envelope comprising first and second plastomeric sheets at least one of which has an adherent capability, the first sheet being transparent and having a magnetic encoding capability provided by a layer of magnetic material in the form of a stripe over a predetermined area of the outermost surface of the transparent sheet; a frame positioned between the sheets providing a rectangular opening which can accommodate the information-bearing medium, the thickness of the frame being substantially the same as the thickness of the information-bearing medium accommodated thereby so that when the information-bearing medium is accommodated by the frame and the first sheet is superposed thereon for lamination, substantially all portions of the stripe can be supported by a substantially flat surface provided by the frame and the medium accomodated therein.

2. A card as defined in claim 1 wherein said second sheet is opaque.

3. A card as defined in claim 1 wherein said second sheet is opaque and embossable.

4. A card of claim 1 wherein a heat activatable adhesive is integrated with said transparent sheet.

5. An I.D. credit card of claim 1 wherein said first and second sheets of said envelope are coupled together prior to lamination to permit wide separation along two adjacent edges thereof for insertion of the information-bearing medium into the frame between the so coupled sheets.

* * * * *